(12) United States Patent
Zhang et al.

(10) Patent No.: US 7,508,627 B1
(45) Date of Patent: Mar. 24, 2009

(54) METHOD AND SYSTEM FOR PROVIDING PERPENDICULAR MAGNETIC RECORDING TRANSDUCERS

(75) Inventors: Lei Larry Zhang, San Jose, CA (US); Danning Yang, Fremont, CA (US); Honglin Zhu, Fremont, CA (US); Ki Sup Chung, San Jose, CA (US); Francis H. Liu, Fremont, CA (US); Yingjiang Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 516 days.

(21) Appl. No.: 11/367,819

(22) Filed: Mar. 3, 2006

(51) Int. Cl.
*G11B 5/147* (2006.01)
(52) U.S. Cl. .................................. 360/125.12
(58) Field of Classification Search ............ 360/125.12, 360/125.13, 125.22, 125.16, 125.06, 125.38, 360/125.34, 125.63, 125.15, 123.15, 123.2, 360/123.09, 317
See application file for complete search history.

(56) References Cited

U.S. PATENT DOCUMENTS

| | | | |
|---|---|---|---|
| 4,274,022 A | 6/1981 | Elsel |
| 4,404,609 A | 9/1983 | Jones, Jr. |
| 4,546,398 A | 10/1985 | Toda et al. |
| 4,636,897 A | 1/1987 | Nakamura et al. |
| 4,646,429 A | 3/1987 | Mori |
| 4,779,463 A | 10/1988 | Woodruff |
| 4,855,854 A | 8/1989 | Wada et al. |
| 4,943,882 A | 7/1990 | Wada et al. |
| 5,027,247 A | 6/1991 | Nakanishi |
| 5,181,151 A | 1/1993 | Yamashita et al. |
| 5,225,953 A | 7/1993 | Wada et al. |
| 5,393,233 A | 2/1995 | Hong et al. |
| 5,578,857 A | 11/1996 | Hong et al. |
| 6,261,918 B1 | 7/2001 | So |
| 6,292,329 B1 | 9/2001 | Sato et al. |
| 6,315,839 B1 | 11/2001 | Pinarbasi et al. |
| 6,353,995 B1 | 3/2002 | Sasaki et al. |
| 6,433,970 B1 | 8/2002 | Knapp et al. |
| 6,475,062 B1 | 11/2002 | Kubota et al. |
| 6,501,619 B1 | 12/2002 | Sherrer et al. |
| 6,504,675 B1 | 1/2003 | Shukh et al. |
| 6,513,228 B1 | 2/2003 | Khizroev et al. |
| 6,522,007 B2 | 2/2003 | Kouno et al. |
| 6,587,314 B1 | 7/2003 | Lille |
| 6,709,322 B2 | 3/2004 | Saldana et al. |
| 6,743,642 B2 | 6/2004 | Costrini et al. |
| 6,751,054 B2 | 6/2004 | Sato et al. |
| 6,757,141 B2 | 6/2004 | Santini et al. |
| 6,784,548 B2 | 8/2004 | Kouno et al. |

(Continued)

*Primary Examiner*—Allen T Cao
(74) *Attorney, Agent, or Firm*—Strategic Patent Group

(57) ABSTRACT

A method and system for providing a magnetic recording transducer are disclosed. The method and system include providing a metallic underlayer directly on a portion of an insulating layer. The method and system also include forming a perpendicular magnetic recording pole on the metallic underlayer. The perpendicular magnetic recording pole has a top, a bottom narrower than the top, and sides. The perpendicular magnetic recording pole has a pole removal rate. The method and system also include providing an insulator having an insulator removal rate. The insulator substantially surrounds at least the sides of the perpendicular magnetic recording pole. The metallic underlayer has a removal rate that is at least one of less than the insulator removal rate and substantially equal to the pole removal rate.

30 Claims, 12 Drawing Sheets

U.S. PATENT DOCUMENTS

| | | |
|---|---|---|
| 6,807,027 B2 | 10/2004 | McGeehin et al. |
| 6,808,442 B1 | 10/2004 | Wei et al. |
| 6,833,979 B1 | 12/2004 | Knapp et al. |
| 6,836,957 B2 | 1/2005 | Kobayashi |
| 6,843,707 B2 | 1/2005 | Saldana et al. |
| 6,876,518 B2 | 4/2005 | Khizroev et al. |
| 6,876,519 B1 | 4/2005 | Litvinov et al. |
| 6,952,867 B2 | 10/2005 | Sato |
| 7,206,166 B2 | 4/2007 | Notsuke et al. |
| 7,227,720 B2 | 6/2007 | Sasaki et al. |
| 7,296,339 B1 | 11/2007 | Yang et al. |
| 2001/0008501 A1 | 7/2001 | Sekine |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0190382 A1 | 12/2002 | Kouno et al. |
| 2002/0191336 A1 | 12/2002 | Hsiao et al. |
| 2002/2100336 | 12/2002 | Hsiao et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 | 2/2004 | Kobayashi |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2005/0011064 A1 | 1/2005 | Lee |
| 2005/0024779 A1 | 2/2005 | Le et al. |
| 2005/0068671 A1 | 3/2005 | Hsu et al. |
| 2006/0044681 A1* | 3/2006 | Le et al. .................... 360/126 |
| 2006/0139802 A1* | 6/2006 | Sasaki et al. ................ 360/126 |
| 2006/0168603 A1* | 7/2006 | Goto ......................... 720/619 |
| 2008/0148301 A1* | 6/2008 | Masaoka et al. ........... 720/601 |
| 2008/0184278 A1* | 7/2008 | Leigh et al. ................ 720/601 |

* cited by examiner

METHOD AND SYSTEM FOR PROVIDING PERPENDICULAR MAGNETIC RECORDING TRANSDUCERS

FIELD OF THE INVENTION

The present invention relates to magnetic recording technology, and more particularly to a method and system for providing perpendicular magnetic recording transducers.

BACKGROUND

FIG. 1 depicts a portion of conventional head 1 including a conventional perpendicular magnetic recording (PMR) transducer 10 and conventional read transducer 40 separated by an insulator 6, as viewed from the air-bearing surface (ABS). For clarity, the conventional PMR transducer 10 is not drawn to scale. Also depicted is the substrate 2, which may be part of a body of a slider (not separately depicted in FIG. 1). The conventional PMR transducer 10 includes a conventional first pole 12, alumina insulating layer 14, alumina underlayer 16 that may be considered part of the alumina insulating layer 14, conventional PMR pole 18 that typically includes a seed layer (not shown), insulating layer 20, shield gap 26, top shield 28, and insulating layer 30. Note that in certain other embodiments, the top shield 28 may also act as pole during writing using the conventional PMR transducer 10. The conventional PMR pole 18 and the top shield 80 are surrounded by insulating layers 20 and 30, respectively. The conventional PMR pole 18 has sidewalls that, for generality, are depicted including segments 22A and 22B and segments 24A and 24B, respectively. In addition, in some cases, the conventional PMR pole 18 may have footings 23 and 25.

In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than 90 degrees in the conventional PMR pole 18 of FIG. 1. A pole having this height and shape is desirable for use in PMR applications.

FIG. 2 is a flow chart depicting a conventional method 50 for fabricating the conventional PMR transducer 10 using a damascene process. For simplicity, some steps are omitted. The conventional method 50 is described in the context of the conventional PMR head 1. The conventional method 10 starts after formation of the first pole 12 and the alumina 14. The alumina underlayer 16 and insulating layer 20 are formed. Thus, the insulating layers 14, 16, and 20 may be part of a single, larger insulating layer. A mask is formed, via step 52. The mask is typically a reactive ion etch (RIE) mask having an aperture that is the same width as the top of the conventional PMR pole 18. A RIE is performed to form a trench in the insulating layer 20, via step 54. The trench in the insulating layer 20 has substantially the same shape as the conventional PMR pole 18. The trench is refilled using the material for the conventional PMR pole 18, via step 56. The mask formed in step 52 may be removed, via step 58. The material may be planarized, via step 60. Consequently, the conventional PMR pole 18 remains. Fabrication of the PMR head 1 is then completed, via step 62.

The conventional method 50 may result in a conventional PMR pole 18 in which the sidewalls are substantially linear. For example, the sidewalls are depicted as being formed of two line segments 22A and 22B that are not linear and segments 24A and 24B that are not linear. When using the method 50, the segments 22A and 22B form a single line and the segments 24A and 24B form a single line. In addition, footings 23 and 25 are typically not present.

Although the conventional method 50 may be used to fabricate the conventional PMR pole 18, there are drawbacks. For example, the changes in the length of the RIE performed in step 54 results in varying thicknesses of the trench. Consequently, the height of the conventional PMR pole 18 may vary. Such a variation between conventional PMR poles 18 is undesirable.

Alternatively, the conventional PMR pole 18 may be formed using a mill-and-lap process. FIG. 3 depicts a conventional method 70 for forming the conventional PMR transducer 10 using a mill-and-lap process. For simplicity, some steps are omitted. The high magnetic moment material for the conventional PMR pole 18 is deposited, via step 72. A chemical mechanical planarization (CMP) stop layer and hard mask layer are deposited, via step 74. A seed layer is deposited, via step 76. A resist pattern for the hard mask layer is formed on the seed layer, via step 78. Step 78 typically includes providing a layer of photoresist and patterning the layer to provide the desired mask. The ion milling mask is plated and the photoresist removed, via step 80. Thus, the ion milling mask is used to mask the desired portions of the high moment material to be used to form the conventional PMR pole 18. The PMR pole material is milled, via step 82. Consequently, the width of the conventional PMR pole 18 and the negative angle are set in step 82. The insulator 20 is deposited around the conventional PMR pole 18, via step 84. A CMP is performed to planarize the surface and expose the conventional PMR pole 18, via step 86. The surface is planarized in order to allow subsequent processing to be performed as desired. The shield gap 26 is provided, via step 88. The top shield 28 is deposited and patterned in step 90. Finally, the region around the top shield 28 is insulated, via step 92.

Although the conventional method 70 can be used to form a conventional PMR transducer 10, the process utilized to trim the conventional PMR pole 18 results in artifacts which adversely affect the functioning of the conventional PMR transducer 10. In particular, the sidewalls of the conventional PMR pole 18 may include one or more angles. Such a condition, in which each segments 22A and 22B and segments 24A and 24B are not linear, is depicted in FIG. 1. The desired profile of the conventional PMR pole 18 is a trapezoid. Consequently, such nonuniformities in the sidewalls 22 and 24 are undesirable. In addition, footings 23 and 25 may be present at the base of the conventional PMR pole 18. The footings 23 and 25 are composed of the material(s) used in forming the pole. Other artifacts may include increased roughness of the sidewalls 22 and 24 as well as redeposition of the pole material being trimmed. These artifacts of the pole trim are generally undesirable.

Accordingly, what is needed is an improved method for fabricating a PMR head.

SUMMARY

A method and system for providing a magnetic recording transducer are disclosed. The method and system comprise providing a metallic underlayer directly on a portion of an insulating layer. The method and system also comprise forming a perpendicular magnetic recording pole on the metallic underlayer. The perpendicular magnetic recording pole has a top, a bottom narrower than the top, and sides. The perpendicular magnetic recording pole has a pole removal rate. The method and system also comprise providing an insulator having an insulator removal rate. The insulator substantially sur-

DETAILED DESCRIPTION OF THE PREFERRED EMBODIMENTS

Figure 1:
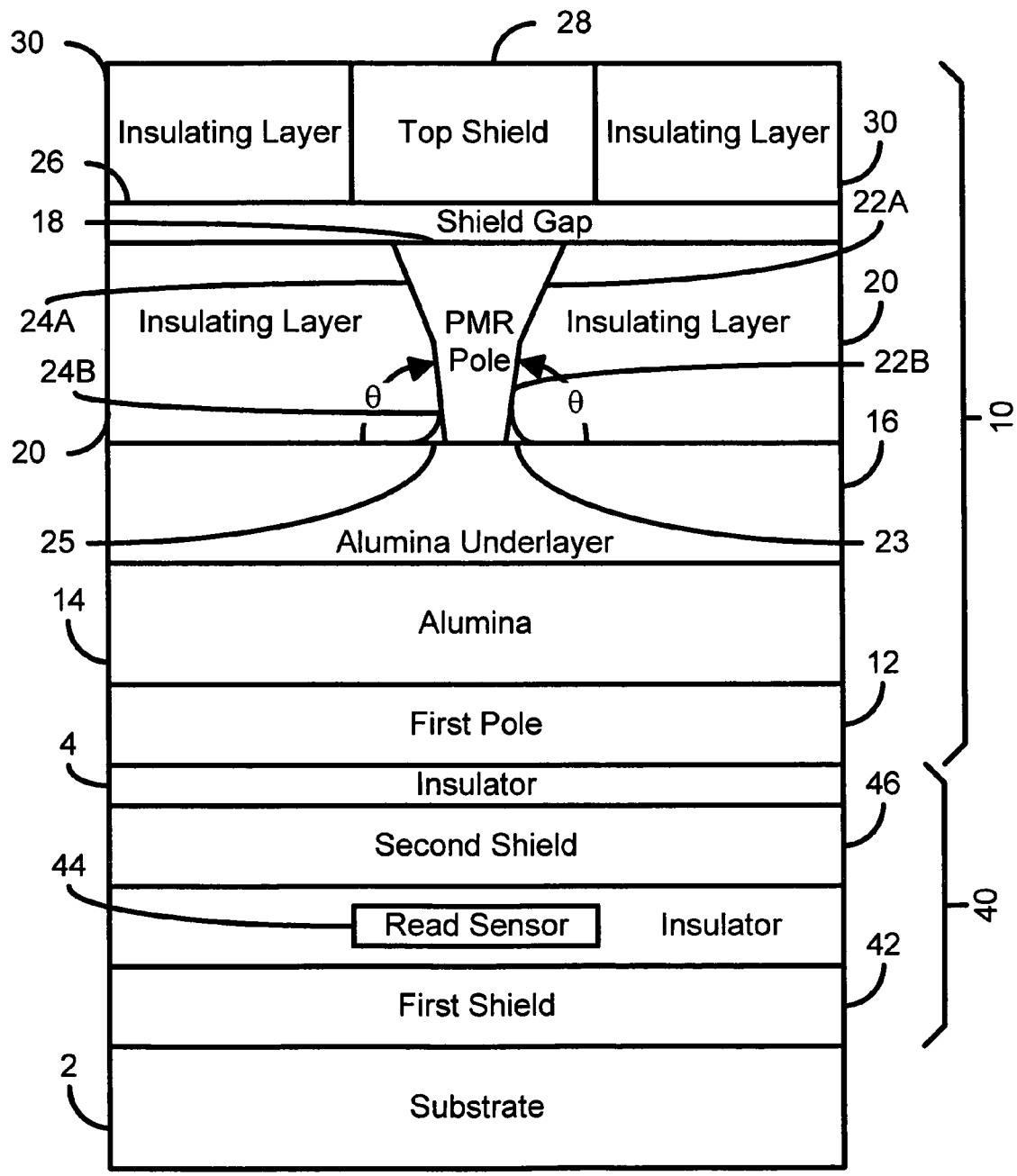
FIG. 1 is diagram depicting a conventional perpendicular magnetic recording head.
Figure 2:
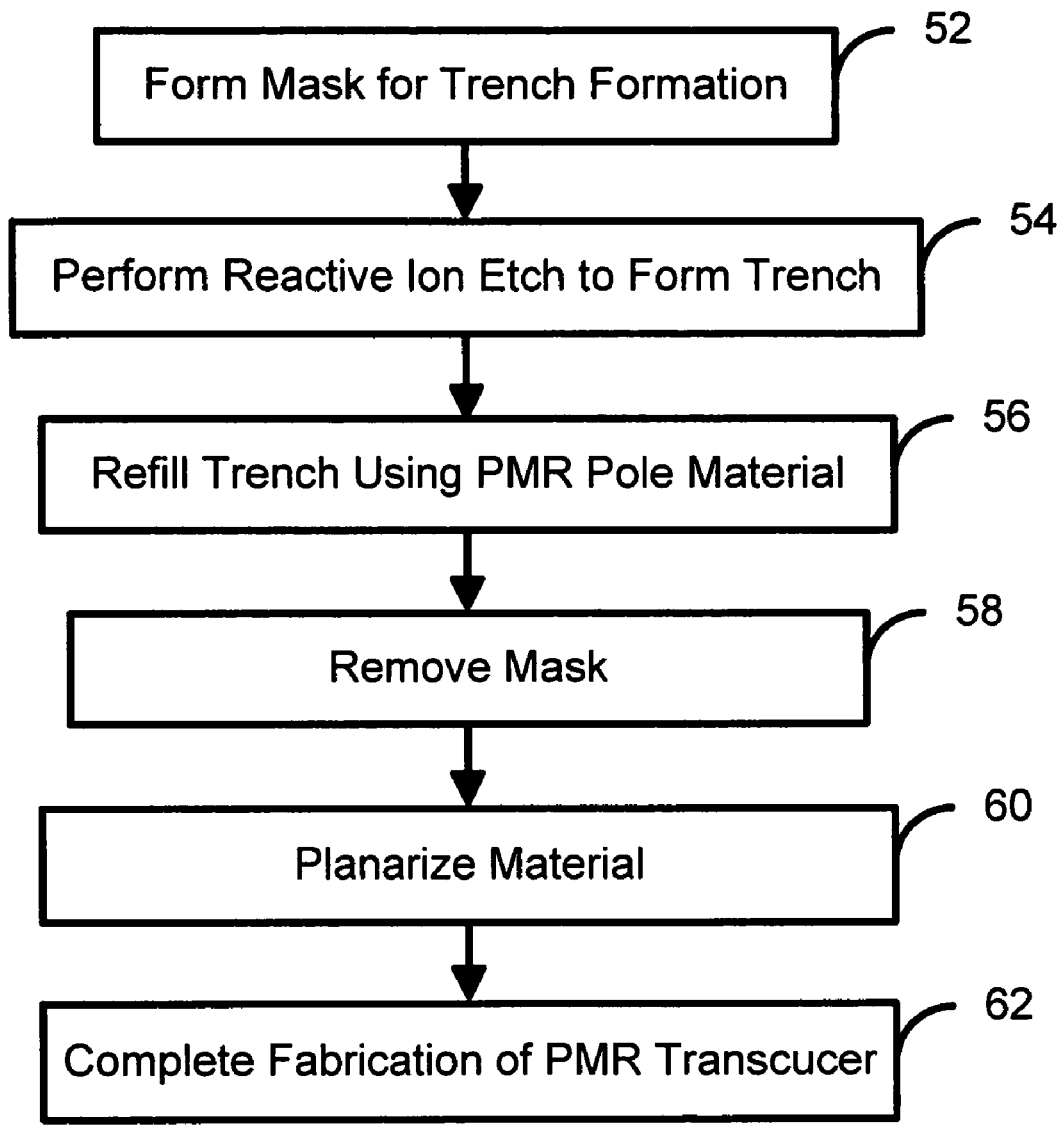
FIG. 2 is a flow chart depicting a conventional method for fabricating a perpendicular magnetic recording pole using a damascene process.
Figure 3:
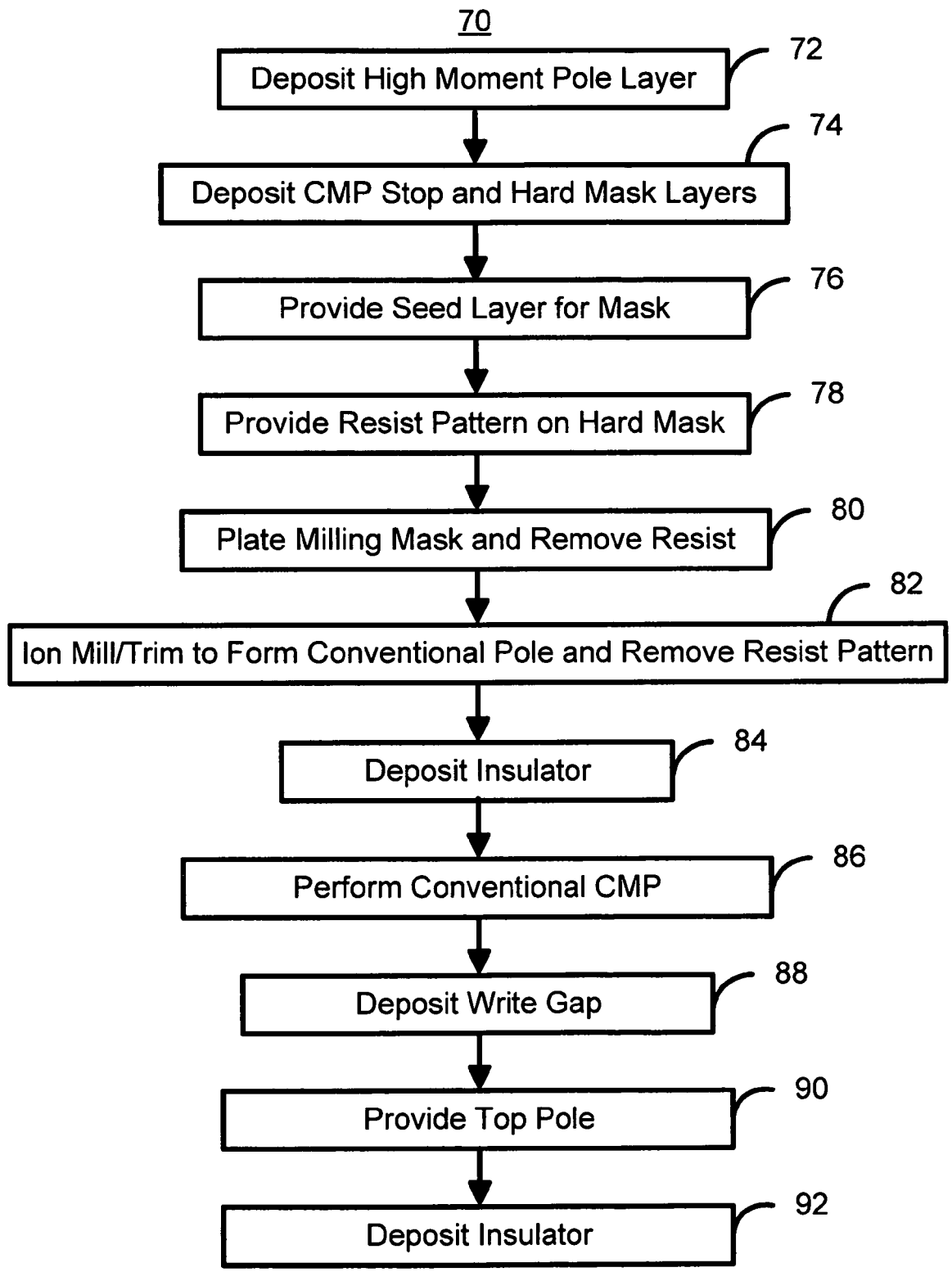
FIG. 3 is a flow chart depicting a conventional method for fabricating a perpendicular magnetic recording pole using a mill-and-lap process.
Figure 4:
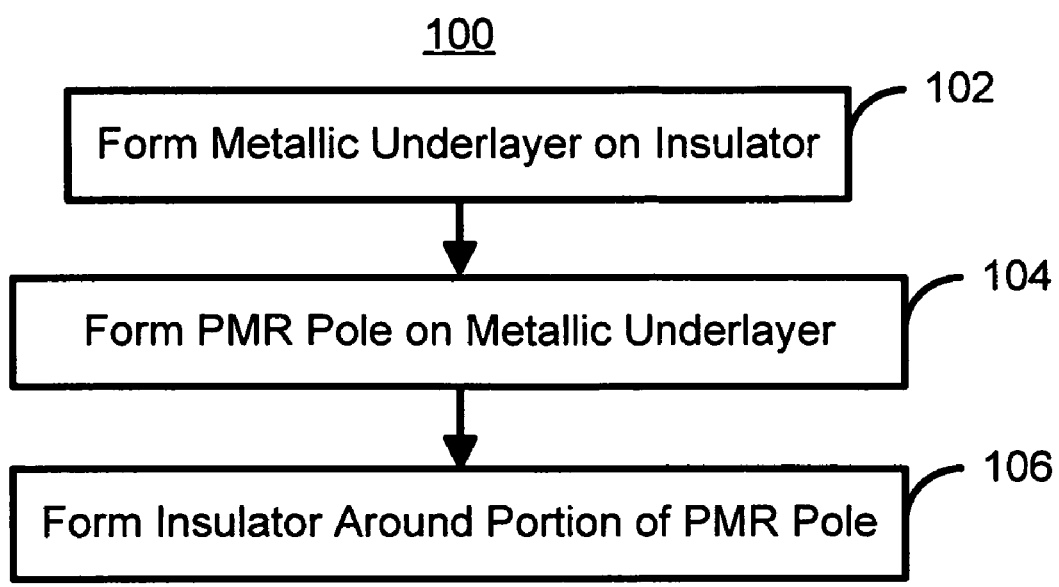
FIG. 4 is a flow chart depicting one embodiment of a method for fabricating a perpendicular magnetic recording pole in accordance with an exemplary embodiment of the present invention.

FIG. 4 is a flow chart depicting one embodiment of a method 100 for fabricating a perpendicular magnetic recording pole in accordance with an exemplary embodiment of the present invention. For simplicity, some steps are omitted. The method 100 is preferably used for a PMR head including a read transducer (not shown) and a PMR transducer. The method 100 also preferably commences after formation of a first pole, formation of a portion of the second pole, and formation of an insulating layer above the first pole.

A metallic underlayer is formed directly on a portion of an insulating layer, via step 102. In a preferred embodiment, a trench is formed in the insulating layer, and the metallic underlayer is formed such that the top of the metallic underlayer and the top of a second pole (not shown) are substantially coplanar. The metallic underlayer may include nonmagnetic metallic materials. Examples of such materials include, but are not limited to Cr, NiCr, NiNb, Ru, and Ta. A PMR pole is formed on the metallic underlayer, via step 104. The PMR pole formed in step 104 has a top, a bottom narrower than the top, and sides. The PMR pole is formed of a material having a pole removal rate. An insulator having an insulator removal rate is formed, via step 106. The insulator substantially surrounds at least the sides of the PMR pole. The metallic underlayer has a removal rate that is less than the insulator removal rate and/or substantially equal to the pole removal rate. In addition, steps 104 and 106 may be performed using a damascene process or a mill-and-lap process. Thus, step 106 may be performed by depositing an insulating layer prior to formation of the PMR pole. The PMR pole may then be formed in a trench in the insulating layer in step 104. In such an embodiment, the removal rate of the metallic underlayer may be one-third through one-half of the insulator removal rate during creation of the trench. Alternatively, the PMR pole may be formed first in step 104, then insulated in step 106. In such an embodiment, the PMR pole may be trimmed. Consequently, the pole removal rate may be less than or substantially equal to the removal rate of the metallic underlayer for such an embodiment.

The method 100 allows for formation of a PMR pole. Variations in the height of the PMR pole may be reduced using the method 100. In addition, the shape of the PMR pole formed may be more trapezoidal than when using a conventional method 70. Moreover, the appearance of footings may be reduced.

Figure 5:
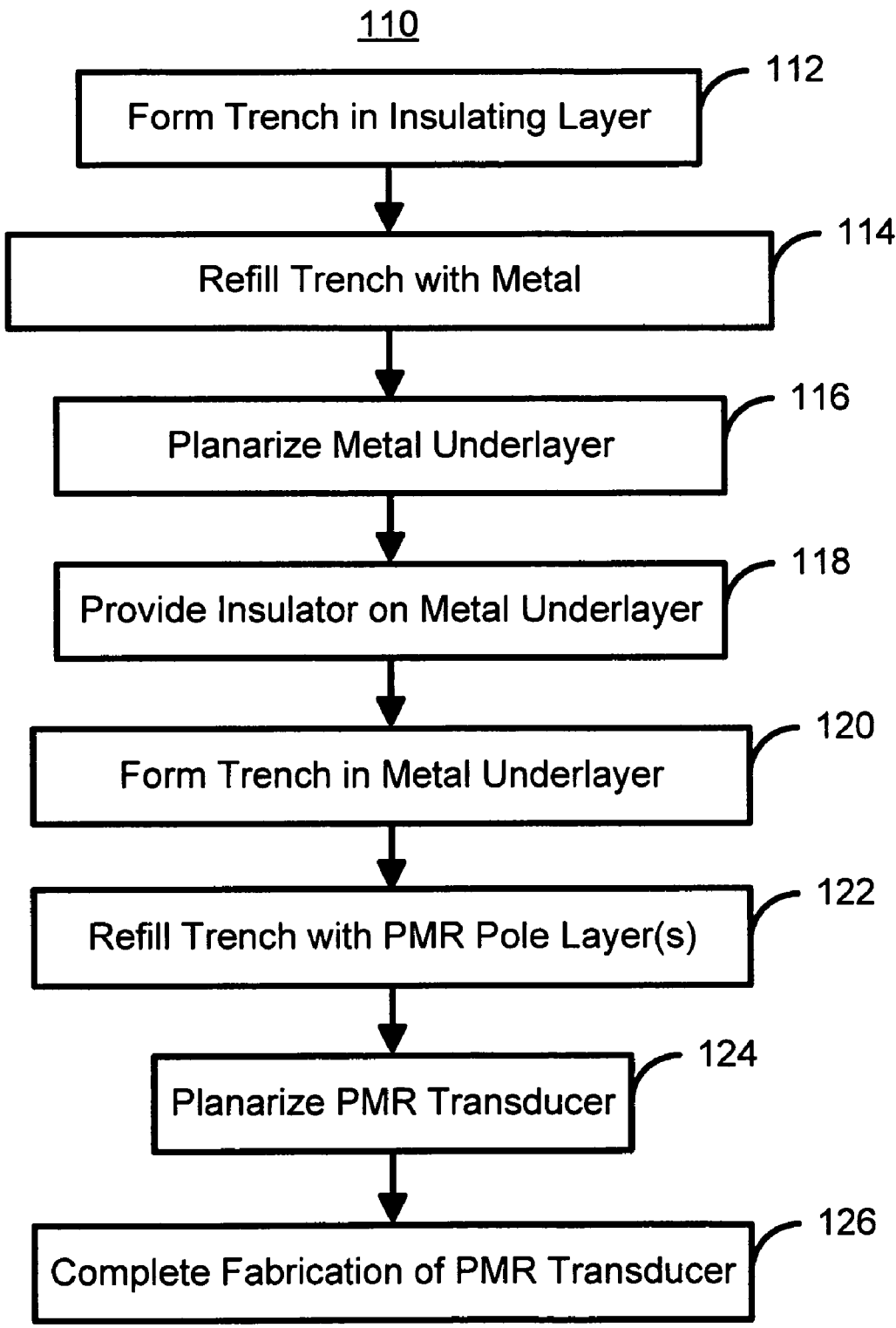
FIG. 5 is a flow chart depicting another embodiment of method for fabricating a perpendicular magnetic recording pole in accordance with an exemplary embodiment of the present invention.

To more particularly describe one embodiment of the method and system in accordance with the present invention, refer to FIG. 5, which depicts a flow chart or an embodiment of method 110 for fabricating a perpendicular magnetic recording pole in accordance with an exemplary embodiment of the present invention using a damascene process. For simplicity, some steps are omitted. The method 110 is preferably used for a PMR head including a read transducer (not shown) and a PMR transducer. FIGS. 6A-6G are diagrams of one embodiment of a perpendicular magnetic recording transducer 130 in accordance with an exemplary embodiment of the present invention during fabrication using the method 110. For clarity, FIGS. 6A-6G are not drawn to scale. The method 110 is described in the context of the PMR transducer 130. Referring to FIGS. 5 and 6A-6G, the method 110 also preferably commences after formation of a first pole, formation of an insulating layer above the first pole, and formation of a portion of the second pole.

Figure 6A:
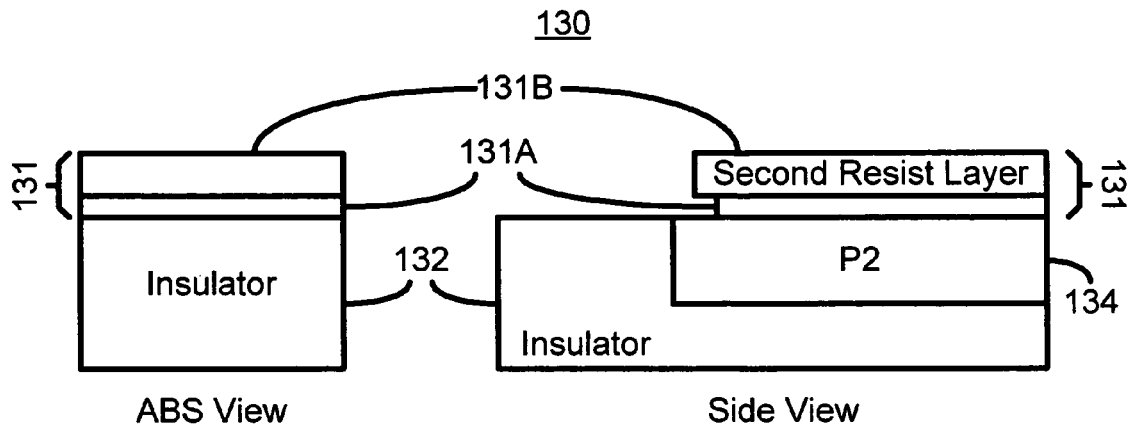
FIGS. 6A-6G are diagrams of one embodiment of a perpendicular magnetic recording transducer in accordance with an exemplary embodiment of the present invention during fabrication.
Figure 6B:
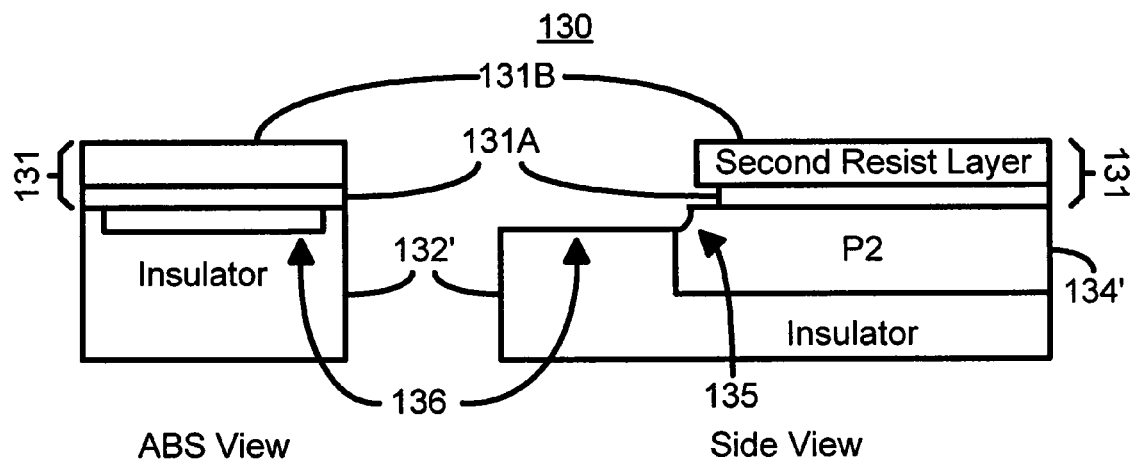

A trench is formed in a portion of the insulating layer above the first pole and in front of a portion of the second pole, via step 112. Step 112 is preferably performed by masking a portion of the second pole using a resist structure and performing a RIE. FIG. 6A depicts ABS and side views of the PMR transducer 130 before formation of the trench. FIG. 6B depicts ABS and side views of the PMR transducer 130 after formation of the trench. Thus, a resist structure 131, an insulating layer 132, and a second pole (P2) 134 are depicted in FIG. 6A. In a preferred embodiment, the resist structure 131 is a bilayer resist structure having layers 131A and 131B. The trench 136 in insulating layer 132' is depicted in FIG. 6B. Furthermore, a notch 135 in the P2 134' has been formed during formation of the trench.

Figure 6C:
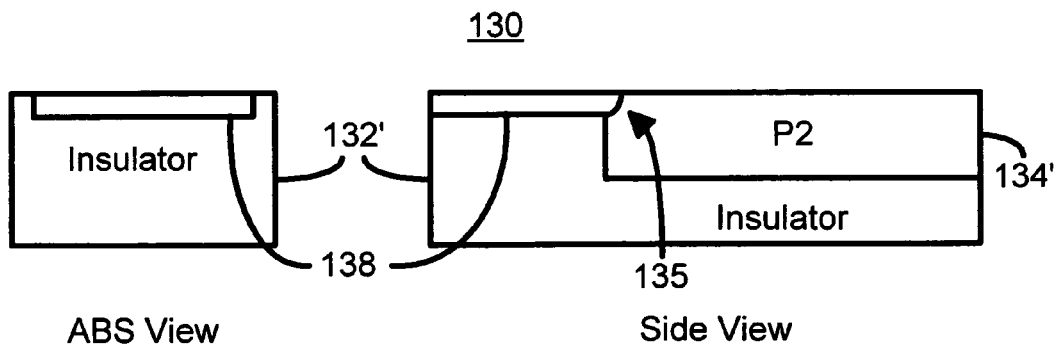

The trench 136 is refilled with a metal, via step 114. The resist structure 131 is removed and the remaining surface optionally planarized, via step 116. In one embodiment, a "kiss" polish is used to planarize the surface. Thus, a metal underlayer is formed. FIG. 6C depicts ABS and side views of the PMR transducer 130 after step 116 is completed. Consequently, the metal underlayer 138 has been provided. The metal underlayer 138 may have a thickness of at least two hundred Angstroms and, more preferably of at least five hundred Angstroms. In one embodiment, the metal underlayer 138 is not more than one thousand Angstroms thick. The metal underlayer 138 may include nonmagnetic metallic materials. Examples of such materials include but are not limited to at least one of Cr, NiNb, Ru, and Ta. In one embodiment, the metal underlayer includes a NiNb/Ta bilayer. In another embodiment, the metal underlayer 138 may be a laminate of multiple layers.

Figure 6D:
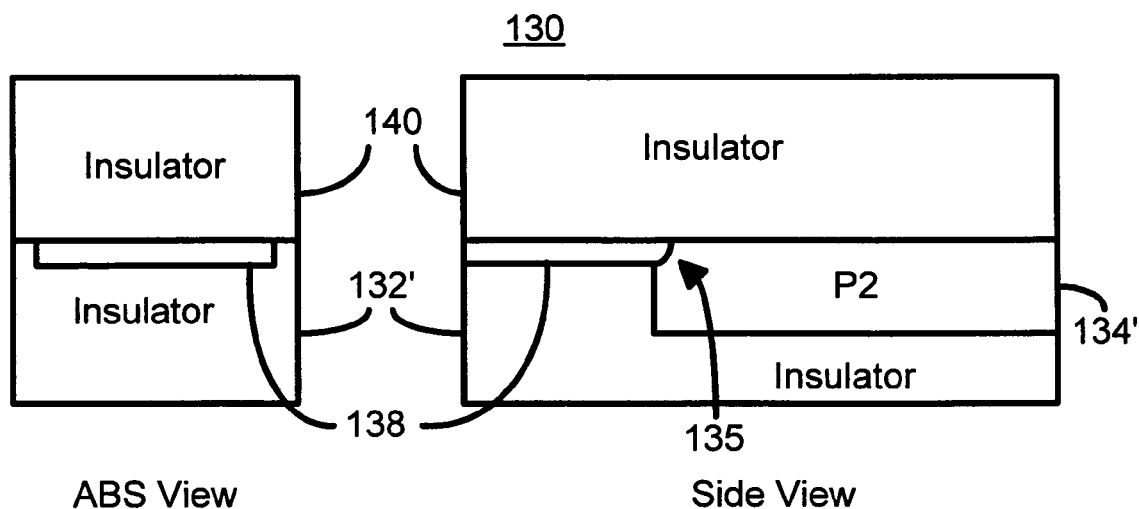

An insulator is provided on the metallic underlayer 138, via step 118. FIG. 6D depicts ABS and side views of the PMR transducer 130 after formation of the insulator 140. Thus, the insulator 140 resides on the metal underlayer 138 as well as P2 134'.

Figure 6E:
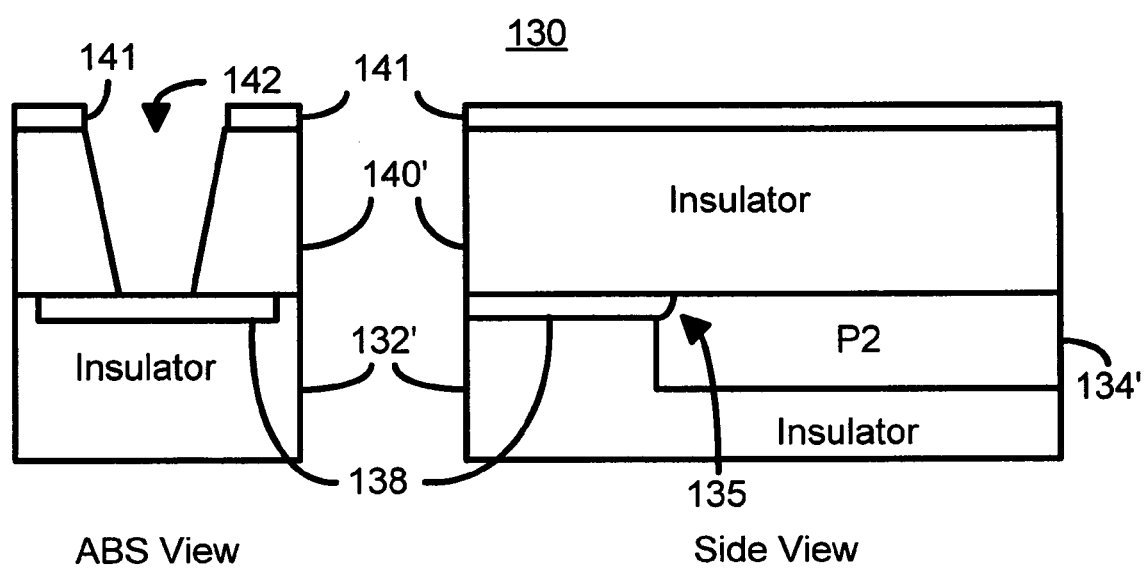

A portion of the insulator 140 is removed to form a trench, via step 120. In a preferred embodiment, step 120 is performed using a RIE. In addition, the metal underlayer is configured such that the removal rate of the metal underlayer 138 is significantly less than the rate of removal than the insulator, which is preferably alumina. In a preferred embodiment, the removal rate of the metal underlayer 138 during the RIE that forms the trench is one-third through one-half of the removal rate of the insulator 140 during the RIE. Consequently, the metal underlayer 138 may be considered to be a stop layer for the process used in forming the trench in step 120. FIG. 6E depicts the PMR transducer 130 after step 120 is completed. Consequently, the trench 142 in insulator 140' is shown. Also depicted is mask 141 used in forming the trench 142. As can be seen in FIG. 6E, the bottom of the trench 142 is formed by a portion the metal underlayer 138.

Figure 6F:
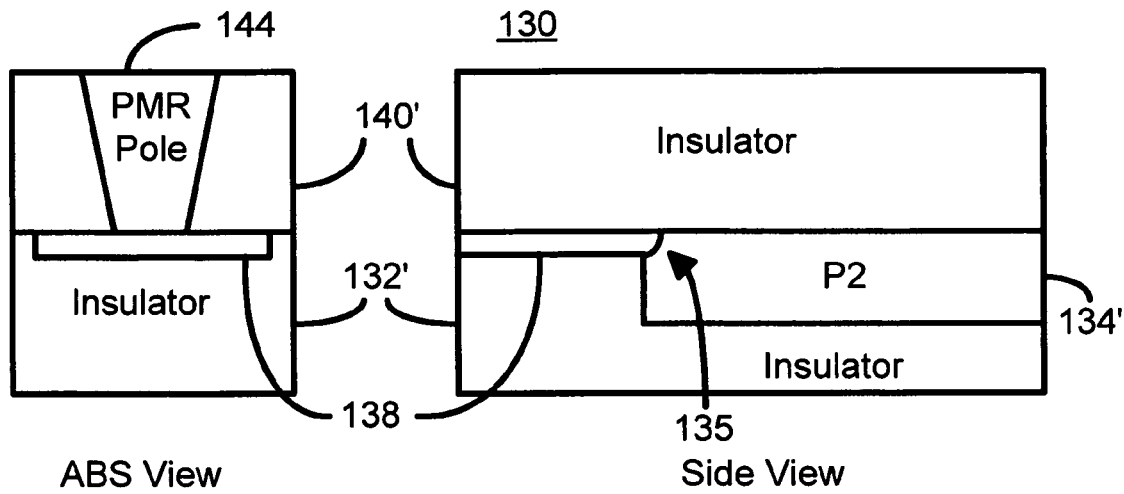
Figure 6G:
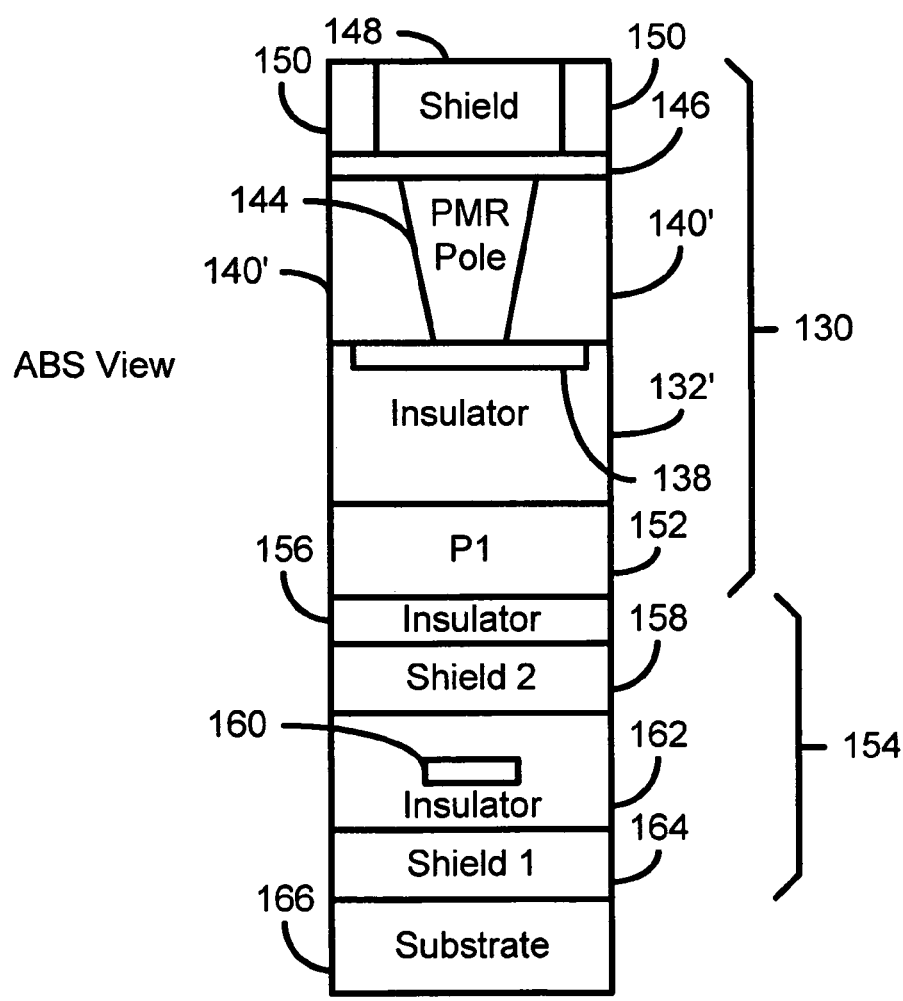

The trench 142 is refilled using one or more layers for a PMR pole, via step 122. The PMR pole layers form a magnetic pole and are provided on the metal underlayer 138, preferably after a seed layer (not shown) is provided. Any excess material may be removed and the PMR transducer 130 may be planarized, via step 124. FIG. 6F depicts the PMR transducer 130 after step 124 is completed. Thus, the PMR pole 144 has been formed. The PMR pole 144 resides in the trench 136 and, therefore, on the metal underlayer 138. Fabrication of the PMR transducer may be completed, via step 126. Step 126 may include forming a write gap, additional shield(s), and/or additional insulating layer(s). FIG. 6G depicts an ABS view of the PMR transducer 130 after fabrication is complete and as incorporated into a head including the PMR transducer 130 and a read transducer 154 on a substrate 166. The PMR transducer 130 includes a first pole 152, insulator 132, metal underlayer 138, insulator 140', PMR pole 144, write gap 146, shield 148 and insulator 150. The read transducer 154 includes a first shield 164, an insulator 162, a read sensor 160 that may be a magnetoresistive sensor, a second shield 158, and an insulator 156.

Using the method 110, the PMR transducer 130 having a PMR pole 144 may be formed. In particular, the trench 142 formed in step 120 has the desired shape for the PMR pole 144. In addition, the metal underlayer 138 may function as an etch stop during the trench formation in step 120. Consequently, the height of the trench 142 may not vary significantly with variations in the length of the etch used in step 120. As a result, variations in the height of the PMR pole 144 are reduced. Thus, processing of the PMR transducer 130 is facilitated.

Figure 7:
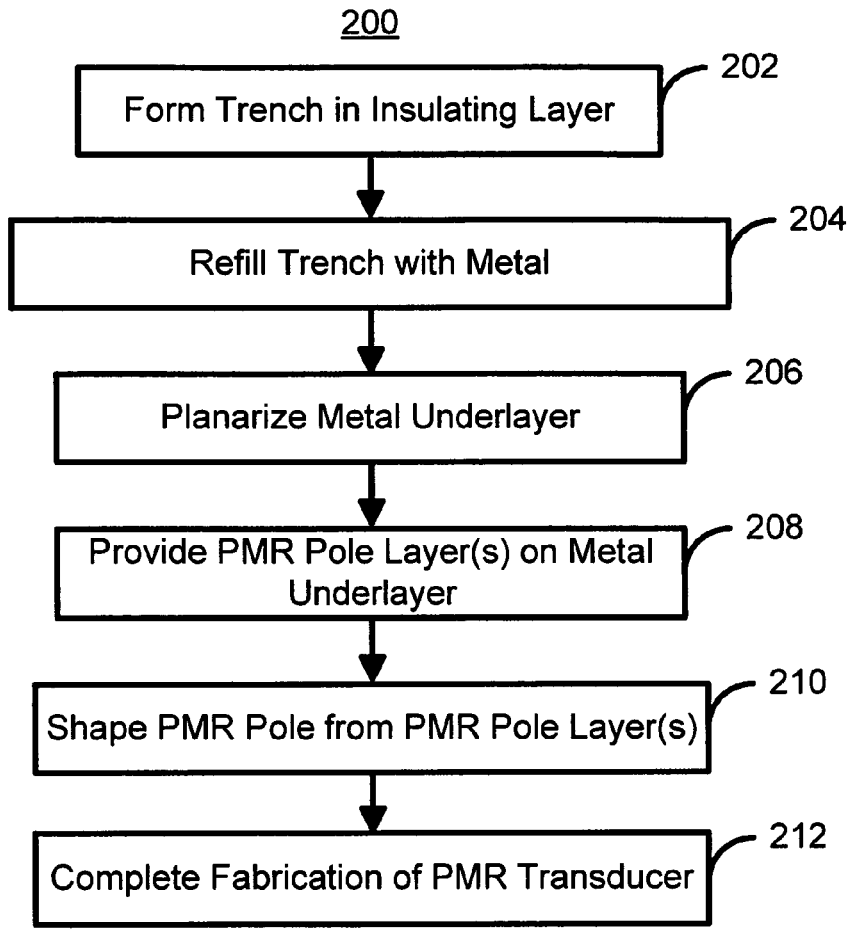
FIG. 7 is a flow chart depicting another embodiment of method for fabricating a perpendicular magnetic recording pole in accordance with an exemplary embodiment of the present invention using a mill-and-lap process.

The method 100 depicted in FIG. 4 may also be used in a mill-and-lap process. FIG. 7 is a flow chart depicting another embodiment of method 200 for fabricating a perpendicular magnetic recording pole using a mill-and-lap process in accordance with an exemplary embodiment of the present invention. For simplicity, some steps are omitted. The method 200 is preferably used for a PMR head including a read transducer (not shown) and a PMR transducer. FIGS. 8A-8G are diagrams of another embodiment of perpendicular magnetic recording transducer 230 in accordance with an exemplary embodiment of the present invention during fabrication. For clarity, FIGS. 8A-8G are not drawn to scale. The method 200 is described in the context of the PMR transducer 230. Referring to FIGS. 7 and 8A-8G, the method 200 also preferably commences after formation of a first pole, formation of an insulating layer above the first pole, and formation of a portion of the second pole.

Figure 8A:
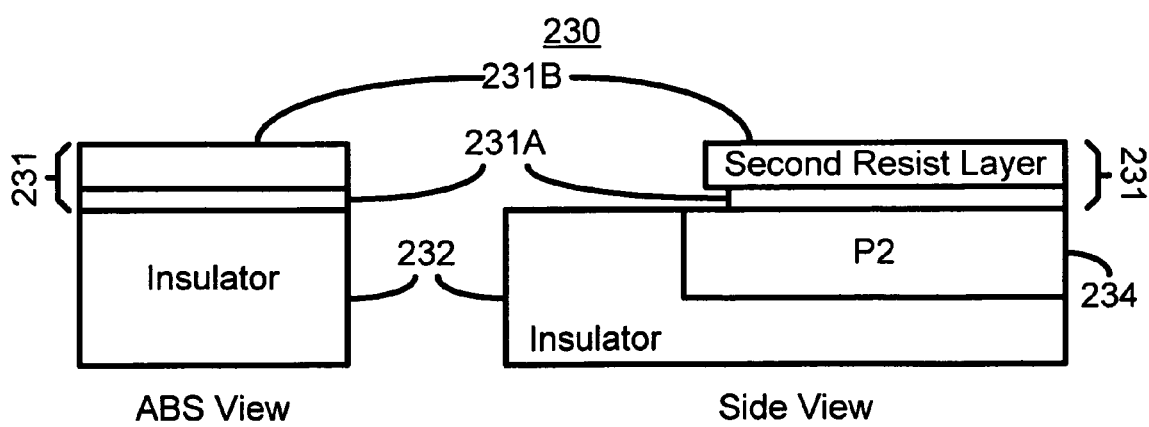
FIGS. 8A-8G are diagrams of another embodiment of perpendicular magnetic recording transducer in accordance with an exemplary embodiment of the present invention during fabrication.
Figure 8B:
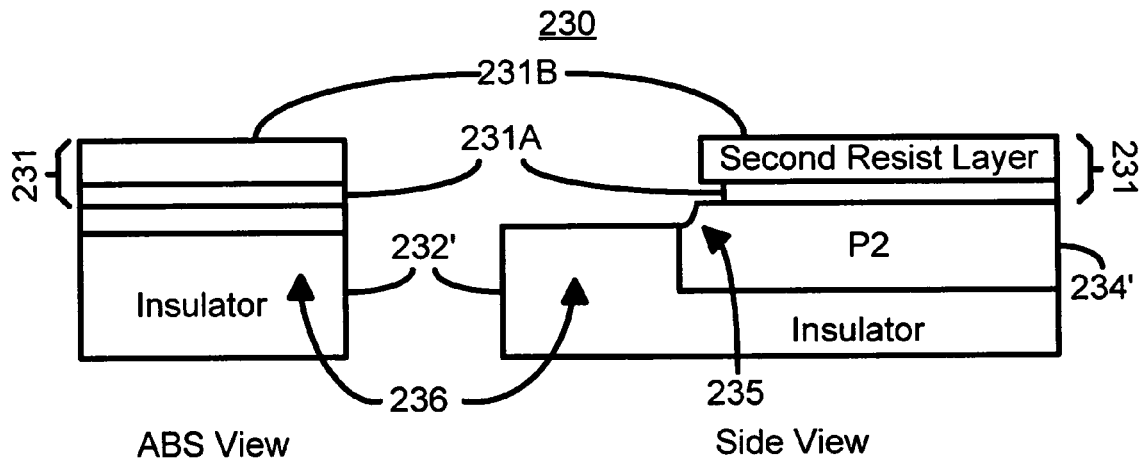

A trench is formed in a portion of the insulating layer above the first pole and in front of a portion of the second pole, via step 202. Step 202 is preferably performed by masking a portion of the second pole using a resist structure and performing a RIE. FIG. 8A depicts ABS and side views of the PMR transducer 230 before formation of the trench. FIG. 8B depicts ABS and side views of the PMR transducer 230 after formation of the trench. Thus, a resist structure 231, an insulating layer 232, and a second pole (P2) 234 are depicted in FIG. 8A. In a preferred embodiment, the resist structure 231 is a bilayer resist structure having layers 231A and 231B. The trench 236 in insulating layer 232' is depicted in FIG. 8B. Furthermore, a notch 235 in the P2 234' has been formed during formation of the trench.

Figure 8C:
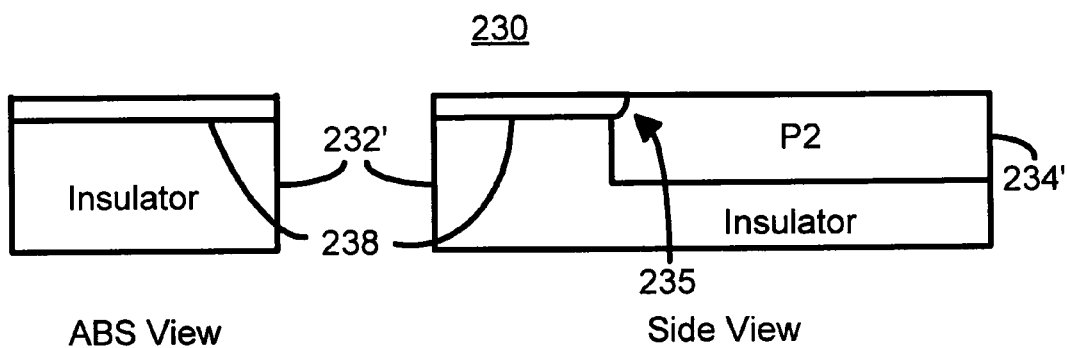

The trench 236 is refilled with a metal, via step 204. The resist structure 231 is removed and the remaining surface optionally planarized, via step 206. In one embodiment, a "kiss" polish is used to planarize the surface. Thus, a metal underlayer is formed. FIG. 8C depicts ABS and side views of the PMR transducer 230 after step 206 is completed. Consequently, the metal underlayer 238 has been provided. The metal underlayer 238 may have a thickness of at least two hundred Angstroms and, more preferably of at least five hundred Angstroms. In one embodiment, the metal underlayer 238 is not more than one thousand Angstroms thick. The metal underlayer 238 may include nonmagnetic metallic materials. Examples of such materials include but are not limited to at least one of Cr, NiNb, Ru, and Ta. In one embodiment, the metal underlayer 238 includes a NiNb/Ta bilayer. In another embodiment, the metal underlayer 238 may be a laminate of multiple layers.

Figure 8D:
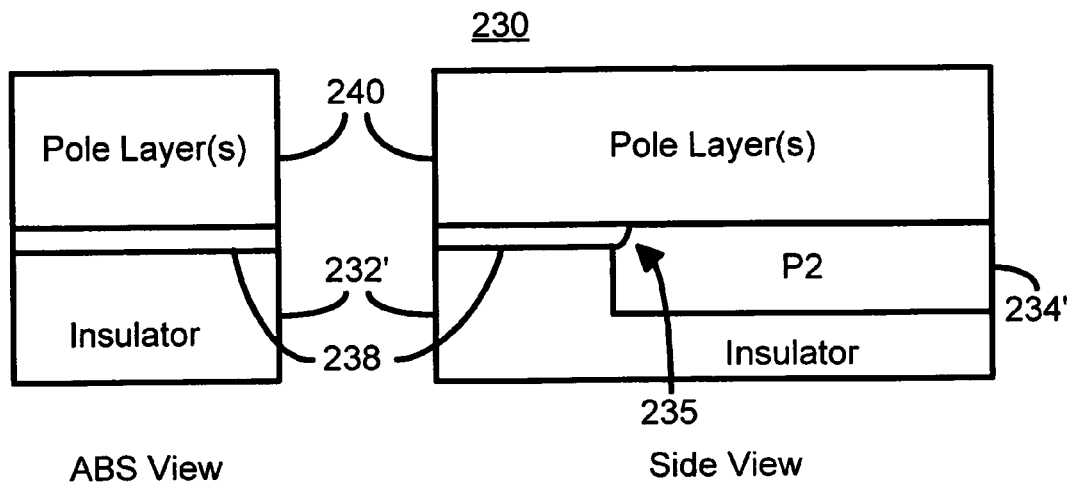

The PMR pole layer(s) are provided, via step 208. In addition, other layers, such as stop layer(s) on the PMR pole layer(s) and/or seed layer(s) under the PMR pole layer(s) may also be provided in step 208. The PMR pole layer(s) form a magnetic structure and are provided on the underlayer 238, preferably after a seed layer (not shown) is provided. FIG. 8D depicts ABS and side views of the PMR transducer 230 after step 208 is performed. Consequently, the PMR pole layers 240 are shown.

Figure 8E:
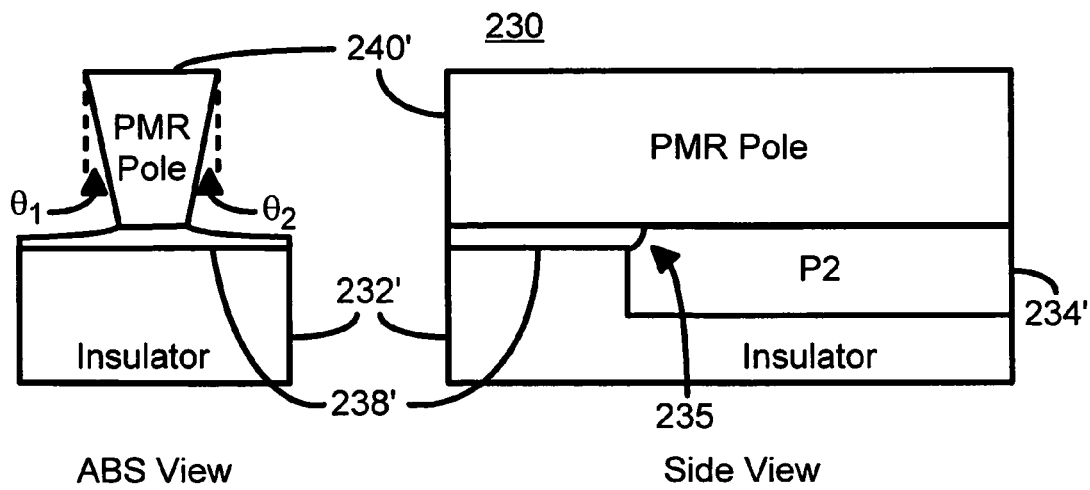

The PMR pole is shaped, via step 210. Step 210 may include performing a pole trim, preferably using ion milling. FIG. 8E depicts the PMR transducer 230 after step 210 is completed. Thus, a PMR pole 240' has been formed from the PMR pole layers 240 depicted in FIG. 8D. The PMR pole 240' has a negative angle, allowing the top of the PMR pole 240' to be wider than the bottom, as shown in FIG. 8E. During the pole trim, the underlayer 238 is also etched, leaving the underlayer 238'. During the pole trim that forms the PMR pole 240', the removal rate of the PMR pole layer 240 is less than or substantially equal to a removal rate of the underlayer 238. Consequently, the underlayer 238' has the profile depicted.

Figure 8F:
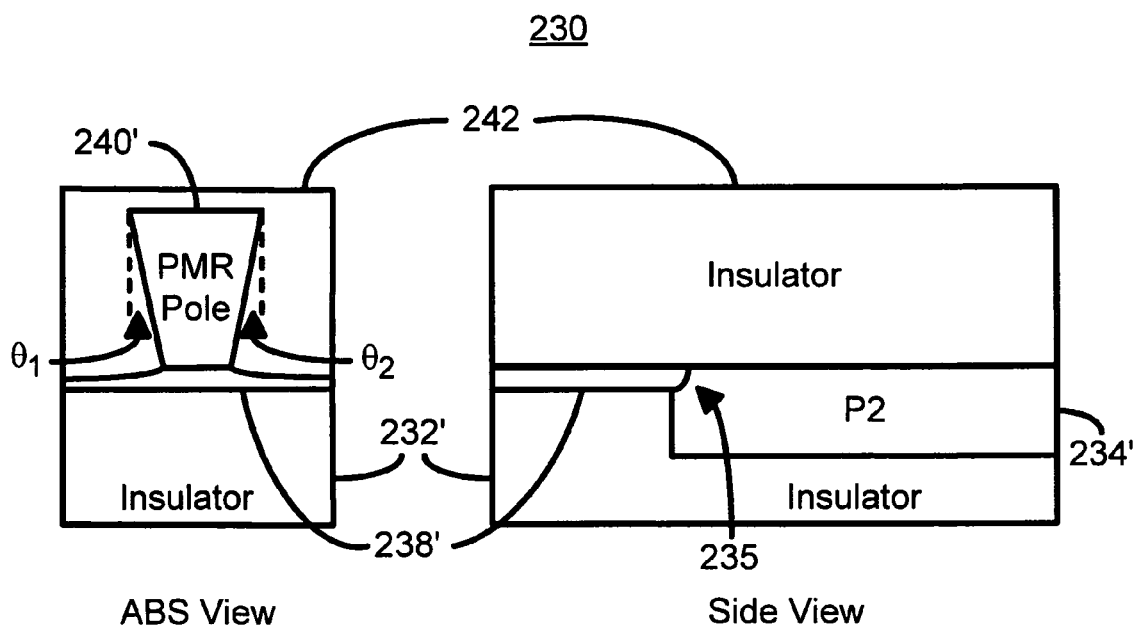
Figure 8G:
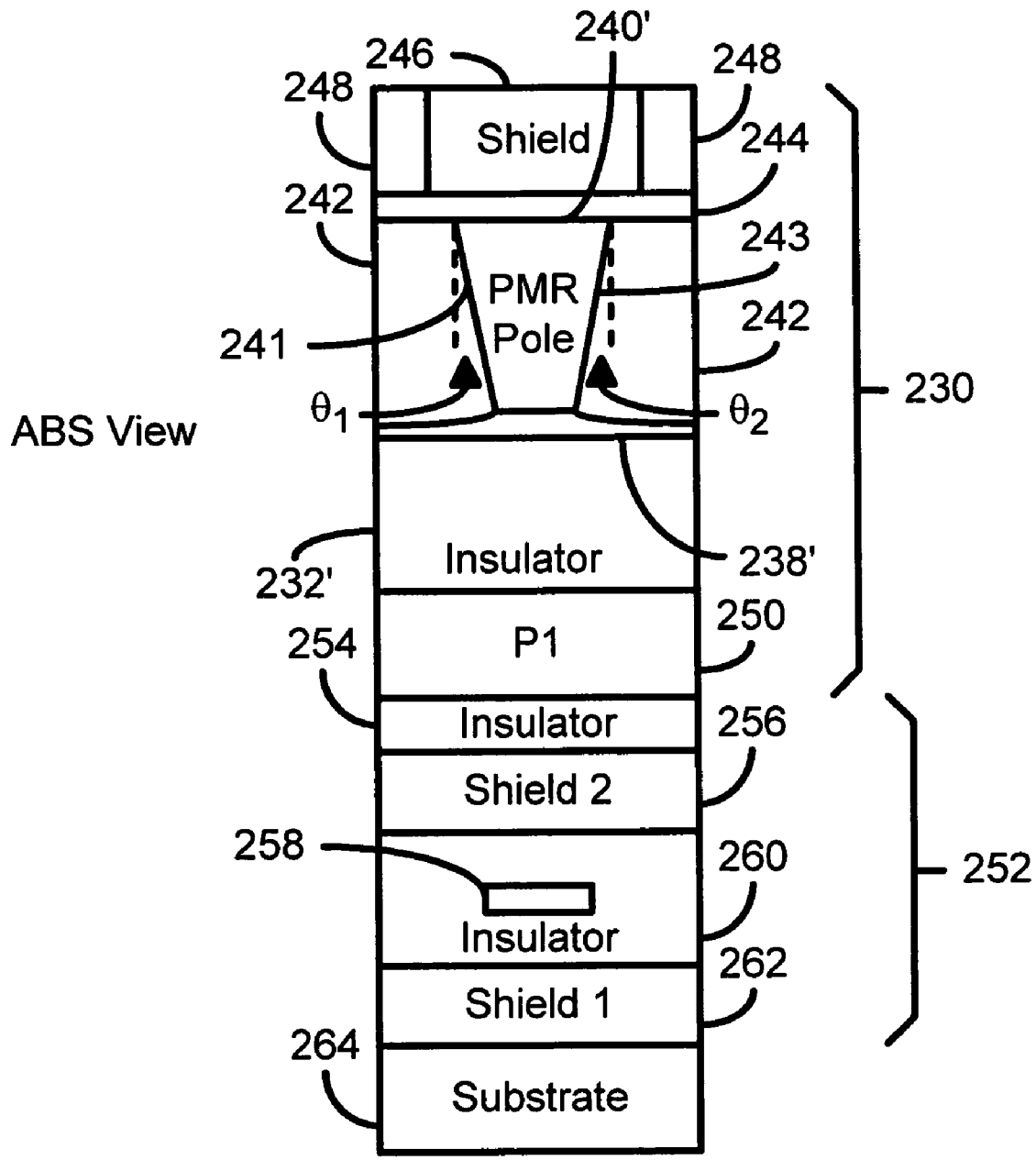

The formation of the PMR transducer 230 is completed, via step 212. For example, step 212 may include insulating the PMR pole, performing desired planarization of the pole and insulator, forming a write gap, additional shield(s), and/or additional insulating layer(s). FIG. 8F depicts the PMR transducer 230 after an insulating layer 242 has been provided. FIG. 8G depicts an ABS view of the PMR transducer 230 after fabrication is complete and as incorporated into a head including the PMR transducer 230 and a read transducer 252 on a substrate 264. The PMR transducer 230 includes a first pole 250, insulator 232, metal underlayer 238', PMR pole 240', insulator 242, write gap 244, shield 246 and insulator 248. The read transducer 252 includes a first shield 262, an insulator 260, a read sensor 258 that may be a magnetoresistive sensor, a second shield 256, and an insulator 254.

Because the removal rate of the PMR pole layer 240' is less than or substantially equal to a removal rate of the underlayer 238' during the pole trim, the sidewalls 241 and 243 of the PMR pole 240' are substantially free of angles and, therefore, preferably substantially planar. Thus, the cross section of the PMR pole 240' is a trapezoid. In addition to being more uniform, the angles, $\theta_1$ and $\theta_2$, the sidewalls 241 and 243 make with vertical may be closer to the desired. In a preferred embodiment, the angles $\theta_1$ and $\theta_2$ are each at least approximately between two and fifteen degrees, and more preferably between five degrees and eight degrees. Moreover, footings at the base of the PMR pole 240' may be reduced or eliminated. In addition to improvements in the uniformity of the angles $\theta_1$ and $\theta_2$, track width uniformity, and sidewall 241 and 243 profile, the trim process that forms the PMR pole 240' may be more efficient. Consequently, performance and fabrication of the PMR transducer 230 may be improved.

Thus, using the methods 100, 110, and 200, fabrication, performance, and reliability of PMR poles 140 and 240' may be improved.

We claim:

1. A method for manufacturing a perpendicular magnetic recording transducer comprising:
   providing a metallic underlayer directly on a portion of an insulating layer;
   forming a perpendicular magnetic recording pole on the metallic underlayer, the perpendicular magnetic recording pole having a top, a bottom narrower than the top, and sides, the perpendicular magnetic recording pole having a pole removal rate; and
   providing an insulator having an insulator removal rate, the insulator substantially surrounding at least the sides of the perpendicular magnetic recording pole, the metallic underlayer having a removal rate that is at least one of less than the insulator removal rate and substantially equal to the pole removal rate.

2. The method of claim 1 wherein the metallic underlayer is a metallic stop layer, wherein the insulator providing is performed before the perpendicular magnetic recording pole forming; and wherein the perpendicular magnetic recording pole forming further includes:
   creating a trench in the insulator, the trench having a bottom and a top, the bottom of the trench including at least a portion of the metallic stop layer and being narrower than the top, the removal rate of the metallic underlayer being less than the insulator removal rate during the trench creating; and
   depositing a perpendicular magnetic pole layer of the perpendicular magnetic recording pole in the trench.

3. The method of claim 2 wherein the perpendicular magnetic recording pole forming further includes:
   performing a planarization.

4. The method of claim 2 wherein the metallic underlayer providing further includes:
   providing the metallic underlayer having a thickness of at least two hundred Angstroms.

5. The method of claim 4 wherein the thickness is at least five hundred Angstroms.

6. The method of claim 5 wherein the thickness is not more than one thousand Angstroms.

7. The method of claim 2 wherein the removal rate of the metallic underlayer is ⅓ through ½ of the insulator removal rate during the trench creating.

8. The method of claim 1 wherein the perpendicular pole forming further includes:
   forming a pole prior to providing the metallic underlayer; and
   removing a portion of the insulating layer adjacent to the pole to form a trench.

9. The method of claim 8 wherein the metallic underlayer providing further includes:
   refilling the trench with a metallic material to form the metallic underlayer having a back, the back of the metallic underlayer being adjacent to the pole.

10. The method of claim 9 further wherein the perpendicular magnetic recording pole forming further includes:
    performing a planarization such that a top surface of the metallic underlayer and a top surface of the pole are substantially coplanar.

11. The method of claim 10 wherein the perpendicular magnetic recording pole forming further includes:
    providing a pole layer on the metallic underlayer, the pole layer having the pole removal rate; and
    removing a portion of the pole layer, the pole removal rate being less than or substantially equal to the removal rate of the metallic underlayer during the removing.

12. The method of claim 11 wherein the perpendicular magnetic recording pole forming further includes:
    performing a pole trim to provide the perpendicular magnetic recording pole.

13. The method of claim 8 wherein the metallic underlayer includes at least one of NiCr, NiNb, Ru, and Ta.

14. The method of claim 1 wherein the metallic underlayer includes a plurality of layers.

15. A perpendicular magnetic recording transducer comprising:
    an insulating layer;
    a metallic underlayer residing directly on a portion of the insulating layer;
    a perpendicular magnetic recording pole having a top and a bottom narrower than the top, at least a portion of the perpendicular magnetic recording pole residing on a first portion of the underlayer;
    an insulator having an insulator removal rate, the insulator substantially surrounding at least the sides of the perpendicular magnetic recording pole, the metallic underlayer having a removal rate that is at least one of less than the insulator removal rate and greater than or substantially equal to the pole removal rate.

16. The perpendicular magnetic recording transducer of claim 15 wherein the metallic underlayer providing further has a thickness of at least two hundred Angstroms.

17. The perpendicular magnetic recording transducer of claim 16 wherein the thickness is at least five hundred Angstroms.

18. The perpendicular magnetic recording transducer of claim 17 wherein the thickness is not more than one thousand Angstroms.

19. The perpendicular magnetic recording transducer of claim 15 wherein the metallic underlayer has a back, the perpendicular magnetic recording transducer further comprising:
    a pole having a notched front, the back of the metallic underlayer being adjacent to the notched front of pole.

20. The perpendicular magnetic recording transducer of claim 19 further wherein metallic underlayer has a top surface that is substantially coplanar with a pole top surface of the pole.

21. The perpendicular magnetic recording transducer of claim 15 wherein the metallic underlayer includes at least one of NiCr, NiNb, Ru, and Ta.

22. The perpendicular magnetic recording transducer of claim 15 wherein the metallic underlayer includes a plurality of layers.

23. A perpendicular magnetic recording head comprising:
a slider; and
a perpendicular magnetic recording transducer adjacent to the slider, the transducer including an insulating layer, a metallic underlayer residing directly on a portion of the insulating layer, a perpendicular magnetic recording pole having a top and a bottom narrower than the top, at least a portion of the perpendicular magnetic recording pole residing on a first portion of the underlayer, and an insulator having an insulator removal rate, the insulator substantially surrounding at least the sides of the perpendicular magnetic recording pole, the metallic underlayer having a removal rate that is at least one of less than the insulator removal rate and greater than or substantially equal to the pole removal rate.

24. The perpendicular magnetic recording head of claim 23 wherein the metallic underlayer providing further has a thickness of at least two hundred Angstroms.

25. The perpendicular magnetic recording head of claim 24 wherein the thickness is at least five hundred Angstroms.

26. The perpendicular magnetic recording head of claim 25 wherein the thickness is not more than one thousand Angstroms.

27. The perpendicular magnetic recording head of claim 23 wherein the metallic underlayer has a back, the perpendicular magnetic recording head further comprising:
a pole having a notched front, the back of the metallic underlayer being adjacent to the notched front of pole.

28. The perpendicular magnetic recording head of claim 23 further wherein metallic underlayer has a top surface that is substantially coplanar with a pole top surface of the pole.

29. The perpendicular magnetic recording head of claim 23 wherein the metallic underlayer includes at least one of NiCr, NiNb, Ru, and Ta.

30. The perpendicular magnetic recording head of claim 23 wherein the metallic underlayer includes a plurality of layers.

* * * * *